US011763617B2

(12) United States Patent
Wang et al.

(10) Patent No.: US 11,763,617 B2
(45) Date of Patent: Sep. 19, 2023

(54) TURNSTILE GATE FOR REGULATING ACCESS IN A TRANSIT SYSTEM

(71) Applicant: Cubic Corporation, San Diego, CA (US)

(72) Inventors: John Y Wang, Escondido, CA (US); Robert McEntee, Encinitas, CA (US)

(73) Assignee: Cubic Corporation, San Diego, CA (US)

( * ) Notice: Subject to any disclaimer, the term of this patent is extended or adjusted under 35 U.S.C. 154(b) by 109 days.

(21) Appl. No.: 17/372,282

(22) Filed: Jul. 9, 2021

(65) Prior Publication Data

US 2022/0012966 A1 Jan. 13, 2022

Related U.S. Application Data

(60) Provisional application No. 63/050,459, filed on Jul. 10, 2020.

(51) Int. Cl.
| | |
|---|---|
| *G07C 9/10* | (2020.01) |
| *G07C 9/22* | (2020.01) |
| *G07C 9/29* | (2020.01) |
| *G06K 7/10* | (2006.01) |
| *G07C 9/00* | (2020.01) |
| *H04L 9/32* | (2006.01) |

(52) U.S. Cl.
CPC ............ *G07C 9/10* (2020.01); *G06K 7/10425* (2013.01); *G07C 9/00309* (2013.01); *G07C 9/22* (2020.01); *G07C 9/29* (2020.01); *H04L 9/3236* (2013.01); *G07C 2009/00412* (2013.01)

(58) Field of Classification Search
CPC ... G07C 9/29; G07C 9/27; G07C 9/22; G07C 9/10; E06B 11/08; H04L 9/3236; G06K 7/10415
See application file for complete search history.

(56) References Cited

U.S. PATENT DOCUMENTS

| | | | | |
|---|---|---|---|---|
| 8,181,035 | B1* | 5/2012 | Fernandez Gutierrez | ................... H04L 9/14 713/176 |
| 10,096,181 | B2* | 10/2018 | Reymann | ................ G07C 9/22 |
| 10,957,136 | B1* | 3/2021 | Kocher | ................... H04L 9/088 |
| 2003/0174044 | A1* | 9/2003 | Murray | ............. G07C 9/00182 340/5.71 |

(Continued)

*Primary Examiner* — Daniel I Walsh
(74) *Attorney, Agent, or Firm* — Mughal Gaudry & Franklin PC (57) ABSTRACT

A gate for regulating access in a transit system is disclosed. The gate comprises a movable barrier, secured storage, an RFID card reader, a first processing unit that processes a set of digits from an RFID credential, generates and transmits a hash value of the set of digits, and transmits a first bin. The gate comprises a memory, having a higher capacity than the secured storage, and a second processing unit, which sends validity information for a plurality of second bins having larger number of digits than the first bin, the validity information indicates which of the plurality of second bins is valid, check if the hash value is member of first list. If the hash value is on the first list, opening of the movable barrier is regulated and if a second bin from the plurality of second bins corresponding to the RFID credential is invalid, opening is denied.

20 Claims, 5 Drawing Sheets

(56) References Cited

U.S. PATENT DOCUMENTS

| | | | |
|---|---|---|---|
| 2006/0278704 A1* | 12/2006 | Saunders | G07B 15/04 |
| | | | 235/382 |
| 2008/0028230 A1* | 1/2008 | Shatford | H04L 9/3231 |
| | | | 713/186 |
| 2008/0211624 A1* | 9/2008 | Micali | H04L 9/007 |
| | | | 340/5.6 |
| 2012/0255994 A1* | 10/2012 | Silbernagl | G06Q 20/0658 |
| | | | 235/382 |
| 2013/0069762 A1* | 3/2013 | Geiszler | G06K 19/0723 |
| | | | 340/5.65 |
| 2013/0090744 A1* | 4/2013 | Tran | H04L 12/282 |
| | | | 700/9 |
| 2014/0282993 A1* | 9/2014 | Van Till | G07C 9/27 |
| | | | 726/9 |
| 2015/0199671 A1 | 7/2015 | Bajaj et al. | |
| 2015/0310425 A1 | 10/2015 | Cacioppo | |
| 2016/0048913 A1 | 2/2016 | Rausaria et al. | |
| 2018/0144563 A1* | 5/2018 | Reymann | E05F 15/76 |
| 2018/0197174 A1 | 7/2018 | Daetz | |
| 2019/0174651 A1* | 6/2019 | Crawford | H05K 7/20836 |
| 2019/0244448 A1* | 8/2019 | Alamin | G07C 9/20 |
| 2021/0303722 A1* | 9/2021 | Donohoe | H04L 9/006 |
| 2021/0326424 A1* | 10/2021 | Einberg | G06F 21/32 |
| 2021/0350197 A1* | 11/2021 | Chow | G06Q 20/3829 |
| 2021/0390811 A1* | 12/2021 | Learmonth | H04L 63/0442 |
| 2022/0012966 A1* | 1/2022 | Wang | G07C 9/10 |
| 2022/0108576 A1* | 4/2022 | Ozono | G07C 9/00309 |

* cited by examiner

TURNSTILE GATE FOR REGULATING ACCESS IN A TRANSIT SYSTEM

CROSS-REFERENCE TO RELATED APPLICATIONS

This application claims the benefit of and is a non-provisional of U.S. Provisional Application Ser. No. 63/050,459 filed on Jul. 10, 2020, which is hereby expressly incorporated by reference in its entirety for all purposes.

BACKGROUND

Turnstile gates have been in use for a long time. In the turnstile gates, Radio Frequency Identification (RFID) credentials are presented at an RFID reader present in the gates. If the RFID credentials are determined to be valid, the gates open or else the gates do not open. To determine if the RFID credentials are valid, the RFID credentials have to pass a set of criteria set by service providers issuing the RFID credentials. The processing to be performed at the gate has to be quick so that the experience of passengers can be enhanced.

However, for faster processing of the RFID credentials, it entailed that the processing the RFID credentials are processed locally at the gates rather than transmitting the credentials over the internet. To ensure local processing, the gates should have enough storage capacity.

The gates have one or more techniques to validate RFID credentials from few digits of the RFID credentials presented at the RFID reader. Further, new guidelines set according to International Standard entails using multiple digits to identify data associated with the RFID credentials. The multiple digits would entail additional amount of storage in the gates which can be solved by replacing the hardware in the gates. However, replacing the hardware would involve cost.

SUMMARY

A gate for regulating access in a transit system is disclosed. The gate comprises a movable barrier, secured storage, an RFID card reader, a first processing unit which reads a set of digits from RFID credential, generates and transmits a hash value of the set of digits and transmits a first bin. The gate comprises a memory, having a higher capacity than the secured storage, and a second processing unit, which sends validity information for a plurality of second bins having greater number of digits than the first bin, the validity information indicates which of the plurality of second bins is valid, check if the hash value is member of first list. If the hash value is on the first list, opening of the movable barrier is regulated and if a second bin from the plurality of second bins corresponding to the first bin is invalid, opening is denied.

In one embodiment, a gate for regulating access in a transit system is disclosed. The gate comprises a movable barrier, secured storage on a first circuit card, a RFID card reader coupled with the secured storage, a first processing unit coupled with the secured storage, wherein the first processing unit is configured to read a set of digits from RFID credential when the RFID credential is presented to the RFID card reader, generate a hash value of the set of digits, transmit a first bin, wherein the first bin is a subset of the set of digits, and transmit the hash value of the set of digits, a memory on a second circuit card, wherein the memory has additional storage capacity than the secured storage, and a second processing unit coupled with the memory, wherein the second processing unit is configured to receive the first bin from the first circuit card, sends validity information for a plurality of second bins to the first card, wherein the validity information indicates which of the plurality of second bins is valid, the plurality of second bins each have a greater number of digits than the digits in the first bin, check if the hash value of the set of digits is a member of a list of a hash values of a plurality of unique-identification numbers associated with a plurality of RFID credentials present in the memory, wherein the list of the hash values of the plurality of unique-identification numbers indicate a list of RFID credentials that belong to a first list, the first processing unit configured to regulate opening of the movable barrier depending on if the hash value of the set of digits is on the first list, and deny the opening of the movable barrier if a second bin from the plurality of second bins corresponding to the first bin is invalid, i.e., if the 7-11 digits corresponding to the RFID credential are not valid for use in the transportation system.

In another embodiment, the disclosure provides a method for regulating access in a transit system. The method comprises in a secured storage on a first circuit card, reading a set of digits from RFID credential when the RFID credential is presented to a RFID card reader, generating a hash value of the set of digits, transmitting a first bin, wherein the first bin is a subset of the set of digits, and transmitting the hash value of the set of digits, in a memory on a second circuit card, receiving the first bin from the first circuit card, sending validity information for a plurality of second bins to the first card, wherein the memory has additional storage capacity than the secured storage, the validity information indicates which of the plurality of second bins is valid, the plurality of second bins each have a greater number of digits than the digits in the first bin, checking if the hash value of the set of digits is a member of a list of a hash values of a plurality of unique-identification numbers associated with a plurality of RFID credentials present in the memory, wherein the list of the hash values of the plurality of unique-identification numbers indicate a list of RFID credentials that belong to a first list, in the first circuit card, regulating opening of a movable barrier depending on if the hash value of the set of digits is on the first list, and denying the opening of the movable barrier if a second bin from the plurality of second bins corresponding to the first bin is invalid, i.e., if the 7-11 digits corresponding to the RFID credential are not valid for use in the transportation system.

In yet another embodiment, a non-transitory computer-readable medium having instructions stored thereon, wherein the instructions, when executed by a plurality of processors, causes the plurality of processors to perform operations comprising in a secured storage on a first circuit card, reading a set of digits from RFID credential when the RFID credential is presented to a RFID card reader, generating a hash value of the set of digits, transmitting a first bin, wherein the first bin is a subset of the set of digits, and transmitting the hash value of the set of digits, in a memory on a second circuit card, receiving the first bin from the first circuit card, sending validity information for a plurality of second bins to the first card, wherein the memory has additional storage capacity than the secured storage, the validity information indicates which of the plurality of second bins is valid, the plurality of second bins each have a greater number of digits than the digits in the first bin, checking if the hash value of the set of digits is a member of a list of a hash values of a plurality of unique-identification numbers associated with a plurality of RFID credentials present in the memory, wherein the list of the hash values of the plurality of unique-identification numbers indicate a list of RFID credentials that belong to a first list, in the first circuit card, regulating opening of a movable barrier depending on if the hash value of the set of digits is on the first list, and denying the opening of the movable barrier if a second bin from the plurality of second bins corresponding to the first bin is invalid.

Further areas of applicability of the present disclosure will become apparent from the detailed description provided hereinafter. It should be understood that the detailed description and specific examples while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
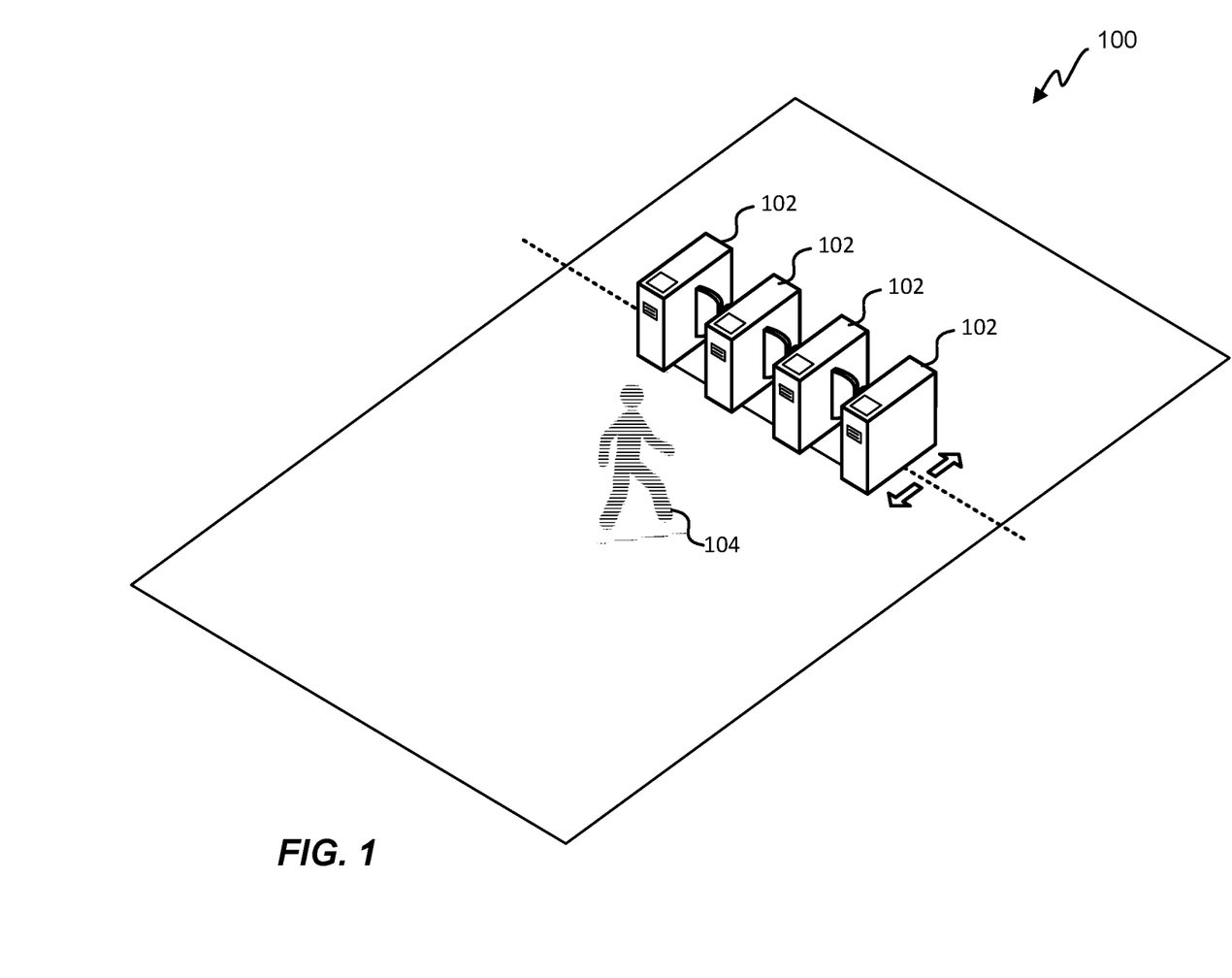
FIG. 1 illustrates an exemplary embodiment of a transit system, in accordance with one embodiment of the present disclosure.

Referring to FIG. 1, illustrates an exemplary embodiment of a transit system 100 according to an embodiment of the present disclosure. The transit system 100 shows a number of turnstile gate 102. A user 104 walks towards gate 102, presents RFID credentials at an RFID reader available at gate 102. If the RFID credentials are valid, the gate 102 opens and user 104 passes through. The RFID credentials can be in the form of an RFID card or can be stored on a smart device available with the user 104. The transit system 100 can be used for any public transport, for example, can be present at a bus station, railway station, etc.

Figure 2:
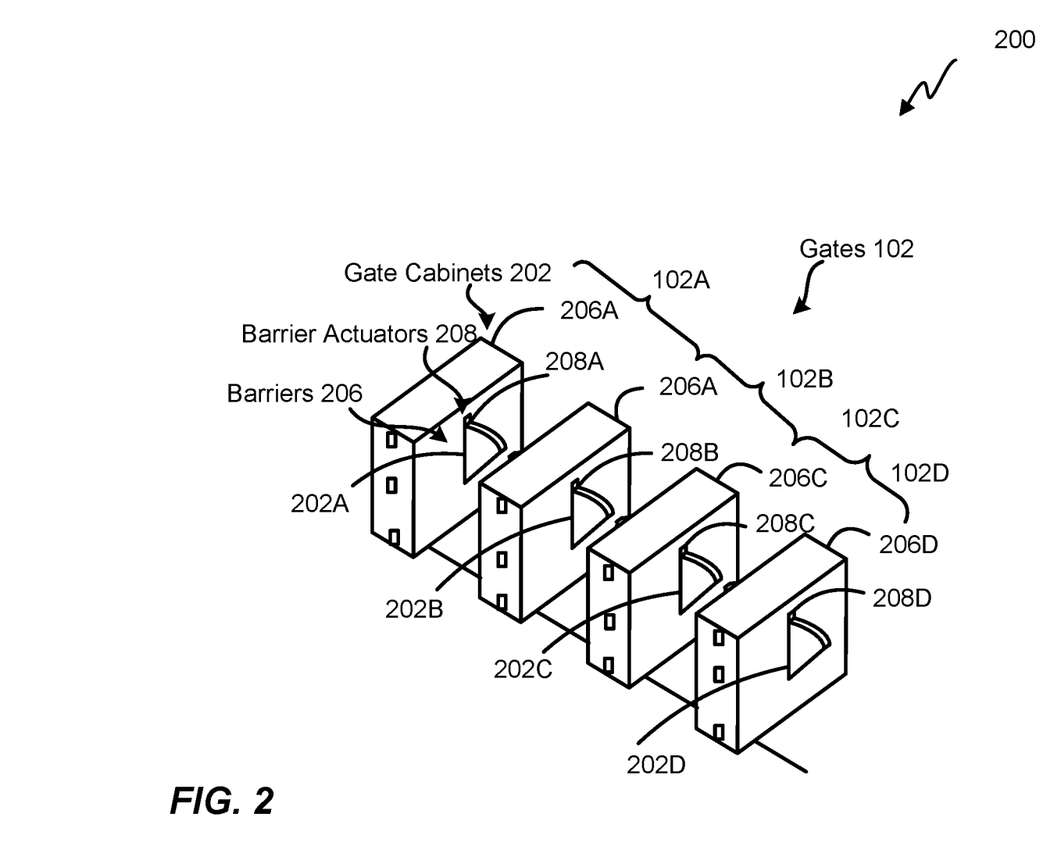
FIG. 2 illustrates a perspective view of a gate array, in accordance with one embodiment of the present disclosure.

FIG. 2 shows a perspective view of a gate array 200, according to an embodiment of the present disclosure. In general, the gate array 200 can be similar to a regular gate line used in transportation systems or environments. For example, the gate array 200 can include the number of RFID-enabled gate (102A, 102B, 102C, 102D) and gate cabinets 202 (202A, 202B, 202C, 202D) (or other types of entry points) which create passageways through the gate array 200. In some embodiments, the RFID-enabled gates 102 can comprise movable barriers 206 (206A, 206B, 206C, 206D). The movable barriers 206 can comprise various types of physical barriers to impede access to a restricted access area, such as turnstiles, sliding doors, boom gates, or gate barriers. In some embodiments, user 104 can swipe a ticket or card across an RFID card reader, for example, so that user 104 can pass through the movable barriers 206 to gain access to a restricted access area from a non-restricted access area. Such an implementation can generally be effective to prevent or at least hinder fare evasion. For example, when a particular ticket or card does not have sufficient funds or is invalid, the movable barrier 206 can remain closed to prevent the individual from entering or accessing the restricted access area. Movable barriers 206 associated with gate 102 can be opened up by a barrier actuator 208 (208A, 208B, 208C, 208D) to allow the user 104 passage upon successful validation of the RFID credentials by the RFID card reader.

Figure 3:
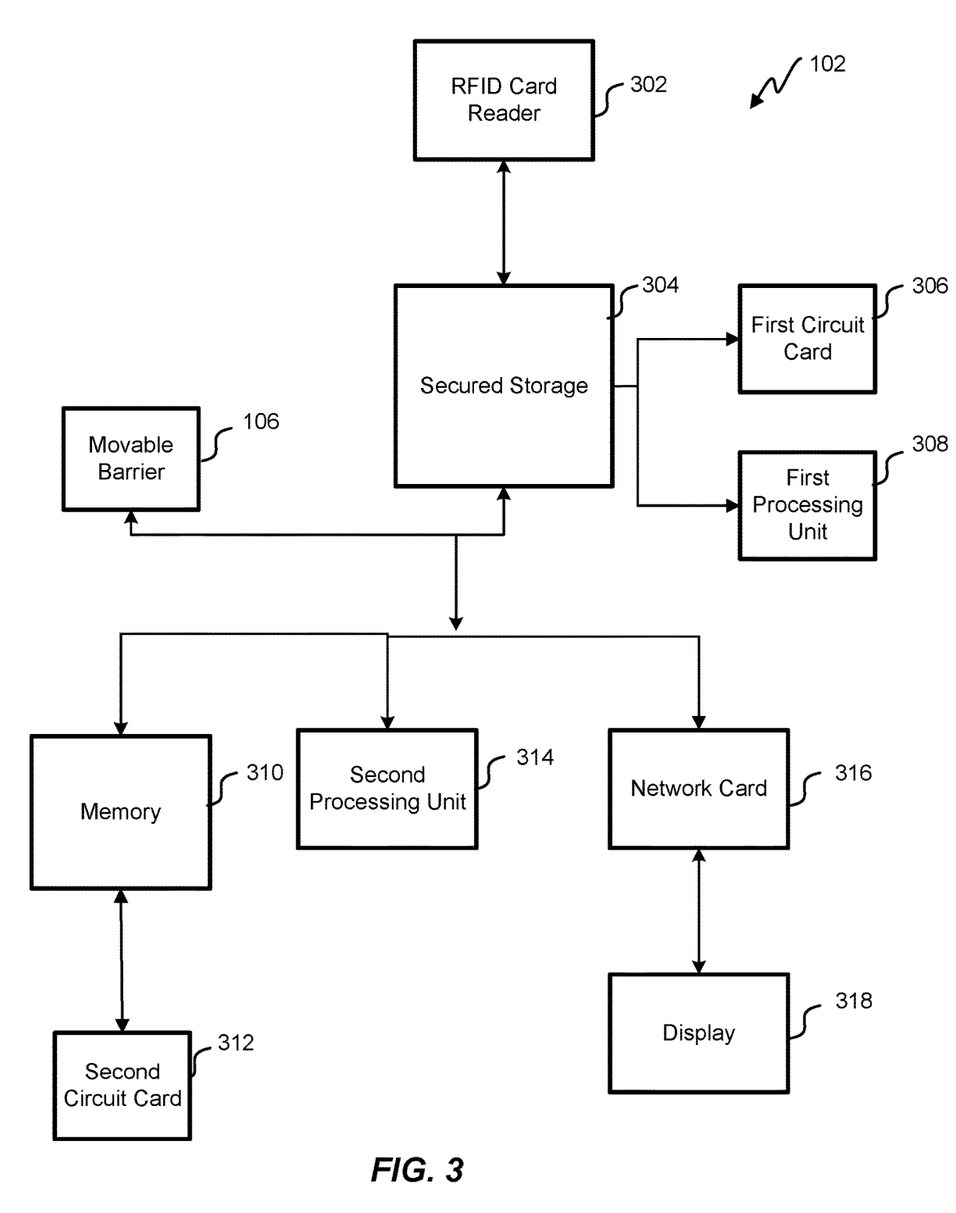
FIG. 3 illustrates a gate for regulating access in a transit system, in accordance with one embodiment of the present disclosure.

Referring to FIG. 3 now, gate 102 for regulating access in the transit system 100 is shown, according to some embodiments of the present disclosure. Gate 102 comprises the movable barrier 206, RFID card reader 302, a secured storage 304 on a first circuit card 306, a first processing unit 308 coupled with the secured storage 304, a memory 310 on a second circuit card 312, and a second processing unit 314 coupled with the memory 310.

The RFID reader 302 used herein can refer to any communication device that can transmit and/or receive wireless signals to or from an RFID tag. The term "RFID reader" can be used interchangeably with the terms "RFID transceiver", "RFID transmitter", "RFID receiver", "transceiver", "transmitter", "receiver", "transmitter antenna", "receiver antenna", and "antenna". For example, in embodiments where several transceivers are disclosed as being positioned along the side of a gate cabinet and/or entry point, some embodiments can include transmitters and/or receivers being positioned along the side of the gate cabinet. Similarly, in embodiments where several antennas are disclosed as being positioned along the side of a gate cabinet and/or entry point, some embodiments can include RFID transceivers, RFID transmitters, and/or RFID receivers as being positioned along the side of the gate cabinet and/or entry point.

The RFID reader 302 processes RFID credentials presented at the RFID reader 302 by the user 104 traveling using the transit system 100 and extracts a first set of digits from the RFID credentials. The RFID credentials can be in the form of RFID cards or can be stored in a smart device present with the user 104. The RFID card can be a prepaid card, a credit card, etc. The smart device can include a smart phone, a smart watch, a tablet, a laptop, etc. The RFID reader 302 applies radio-frequency identification (RFID) techniques to automatically identify RFID credentials.

The RFID reader 302 is coupled with the secured storage 304. The secured storage 304 is present on a first circuit card 306. The first circuit card 306 can comprise of various electronic components for the functioning of the secured storage 304. For example, the first circuit card 306 can include transistors, resistors, etc. The secured storage 304 can be a volatile memory such as a flash memory, a random-access memory, etc. The secured storage 304 can be tamper proof i.e., stores sensitive information and requires protection of this information from attackers. The secured storage 304 ensures data security and integrity of RFID credentials.

The first processing unit 308 is coupled with the secured storage 304. The first processing unit 308 is configured to communicate with the secured storage 304 and process the data present on the secured storage 304. For example, the first processing unit 308 is configured to read the first set of digits from the RFID credentials when the RFID credentials are presented to the RFID reader 302. The first processing unit 308 is also configured to transmit a first Bank Identification Number (BIN) and transmit the first bin to the memory 310. The first bin is a subset of the set of digits of the RFID credentials which were read by the RFID card reader 302. The first bin is entailed by the banks to identify the type of RFID credentials. Further, the first processing unit 308 is configured to generate a hash value of the set of digits of the RFID credentials.

The memory 310 is storage that has additional storage capacity than the secured storage 304. For example, the memory 310 has three times additional capacity than the secured storage, however, is not limited. In various other embodiments, the memory 310 has 10 time or more, 50 times or more, 100 times or more, 500 times or more, or 1000 times or more capacity than the secured storage. Thus, memory 310 stores additional data than the secured storage 304. The memory 310 is present on the second circuit card 312. The second circuit card 312 can be similar in construction to the first circuit card 306. Thus, the second circuit card 312 can also comprise transistors, resistors, etc.

The second processing unit 314 is coupled to the memory 310. The second processing unit 314 is configured to receive the first bin transmitted by the first processing unit 308. Further, the second processing unit 314 is configured to send validity information for a number of second bins to the first circuit card 306. The validity information indicates which of the number of second bins are valid. The number of second bins each has a larger number of digits than the first bin. In one embodiment, the second bin comprises of eight digits or 7-11 digits in various embodiments.

The validity of the RFID credentials can be determined by a service provider (for example, a bank) issuing the RFID credentials. For example, the service provider can issue multiple types of credentials to users. From the multiple types of credentials, the service provider can identify few credentials which are valid for transit systems and others which are not valid for transit systems. Thus, the plurality of second bins helps identify which of the RFID credentials are of a valid type and which are not of valid types. The plurality of second bins indicates the type of RFID credentials that are not valid.

As the new payment guidelines require entail that the usage of 7-11 digits instead of 6 digits (as used earlier) to identify various details (including the validity) relating to the RFID credentials, the first processing unit 308 checks if the first bin is within a range of the plurality of second bins. Thus, if the first bin is within a range of the plurality of the second bins, it is determined that the RFID credentials presented at the RFID reader 302 are invalid. Given this, the first processing unit 308 denies the opening of the movable barrier 206.

The second processing unit 314 is also configured to receive a hash value of the set of digits transmitted by the first processing unit 308. Further, the second processing unit 314 is configured to check if the hash value of the set of digits is a member of a list of hash values of a plurality of unique-identification numbers associated with a plurality of RFID credentials present in the memory, wherein the list of the hash values of the plurality of unique-identification numbers indicate a list of RFID credentials which belong to a first list.

Since the set of digits of the RFID credentials are considered to be secure, to transmit them outside of the secured storage 304, generation of the hash value of the set of digits of the RFID credentials is entailed. The generation of the hash value ensures that the set of digits of the RFID credentials are secured from attackers. A similar hashing algorithm is used by the second processing unit 314 to hash the list of hash values of the plurality of unique-identification numbers present in the memory 310. The plurality of unique-identification numbers are associated with the RFID credentials and indicate the unique-identification numbers belonging to a first list. The first list comprises the list of unique-identification numbers which are blacklisted by the service provider issuing the RFID credentials. The service provider can blacklist few RFID credentials based on multiple number of factors, for example, if the customer did not pay the bill on time or some fraudulent transactions have been detected by the service provider concerning the RFID credentials.

The number of entries in the first list can quite large, hence larger space for storage is entailed. Thus, the list is stored in memory 310 which has additional capacity than the secured storage 304. Further, the first list can be periodically updated by the service providers. For example, if a user has paid the bill associated with the RFID credentials, the first list can be updated by the service provider instantly i.e., the unique-identification number against which the bill has been paid is moved from the blacklisted to non-blacklisted.

Thus, based on a determination if the hash value of the set of digits is on the first list, the first processing unit 308 regulates the opening of the movable barrier 206. For example, if the hash value of the set of digits is not present on the first list, i.e., the RFID credentials do not belong to the unique-identification number which is blacklisted, the first processing unit allows opening of the movable barrier 206. On the other hand, if the hash value of the set of digits is present on the first list, i.e., the RFID credentials belong to the unique-identification number which is blacklisted, the first processing unit denies opening of the movable barrier 206.

In one embodiment, the first list can be a list of unique-identification numbers which are not blacklisted by the service providers issuing the RFID credentials. In that case, if the hash value of the set of digits is present on the first list, i.e., the RFID credentials do not belong to the unique-identification number which is blacklisted, the first processing unit permits opening of the movable barrier 206. On the other hand, if the hash value of the set of digits is not present on the first list, i.e., the RFID credentials belong to the unique-identification number which is blacklisted, the first processing unit denies opening of the movable barrier 206.

The processing of data by the first processing unit 308 and the second processing unit 314 including the reading of the RFID credentials by the RFID reader 302 is happening with a normal pace of a user who desires to pass through gate 102 i.e., within an interval of half-second or even less. For example, an average user can walk at a normal pace of 2 meters per second. However, the pace is not limited to 2 meters per second and may depend on height of the user.

Gate 102 further comprises a network card 316 that lets the gate 102 exchange data with a network over the internet. The data can be exchanged with servers of the service providers (for example banks). The data can include checking if the first list has been updated upon payment of the bills by the users.

Gate 102 further comprises a display 318 which can be responsible for displaying information relating to the RFID credentials to user 104. The information can include balance associated with the RFID credentials, or an error message rejecting the RFID credentials, etc.

Figure 4:
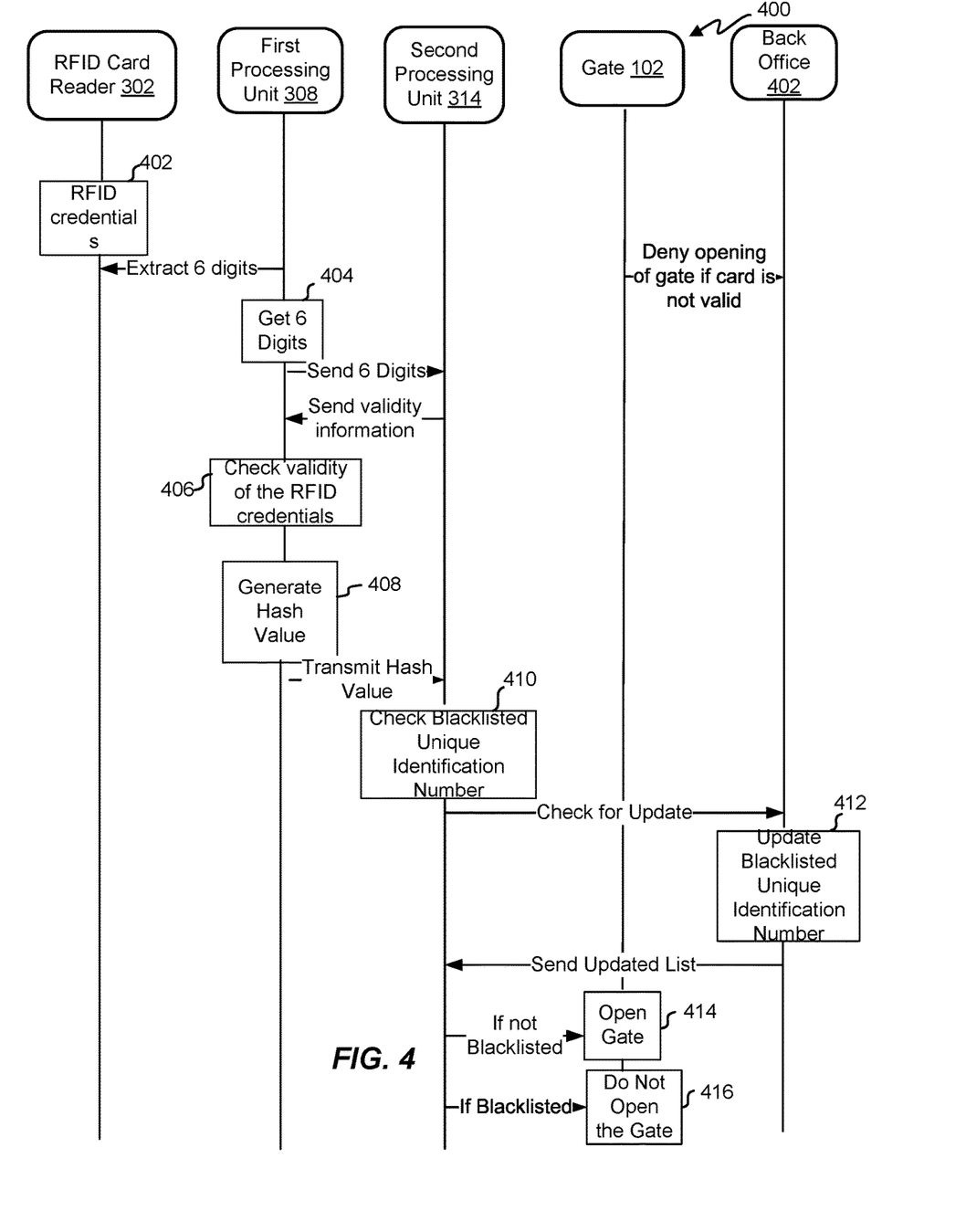
FIG. 4 illustrates a swim diagram showing communication between various entities in accordance with one embodiment of the present disclosure.

Referring to FIG. 4 now, a swim diagram 400 showing communication between various entities are shown, in accordance with an embodiment of the present disclosure. The swim diagram 400 shows communication between the RFID card reader 302, the first processing unit 308, the second processing unit 314, the gate 102, and a back-office 402. The back-office 402 can be a cloud server of the service provider issuing the RFID credentials.

At block 402, the RFID credentials are presented at the RFID card reader 302. At block 404, 6 digits of the RFID credentials are extracted and transmitted by the first processing unit 308 to the second processing unit 314. The second processing unit 314 sends validity information for 7-11 digits, depending on embodiment, to the first processing unit 308. The validity information indicates which of the plurality of 7-11 digits in various embodiments is valid.

At block 406, the first processing unit 308 checks if the digits of the RFID credentials are in the range of the 7-11 digits (dependent on embodiment). Comparison with the 7-11 digits is done per the new payment guidelines. If the full digits are in the range of the 7-11 digits, the RFID credentials are considered to be invalid type. For example, one embodiment may have 8 digits for various bins where some are valid for use in the transit system, while others are not such that the RFID credentials would not allow access to the transit system.

If the RFID credentials is not of valid type, the first processing unit 308 denies opening of gate 102. In particular, the first processing unit 308 denies movement of the movable barrier 206.

At block 408, the first processing unit 308 generates a hash value of the digits of the RFID credentials. The RFID credentials are generally of 16 digits. In general, the digits of the RFID credentials are considered to be secured and are not to be shared with anyone for security purposes. Hence, the hash value is generated of the digits of the RFID credentials. The hash value of the digits of the RFID credentials is transmitted to memory 310.

At block 410, the second processing unit 314 checks if the hash value of the digits is a member of a list of hash values of a plurality of unique-identification numbers associated with a plurality of RFID credentials present in memory 310.

At block 412, the second processing unit 314 sends a command to the back office 402 to check if there is any update in the first list. If there is any update, second processing unit 314 receives the updated first list. In another embodiment, the list of updated blacklisted unique-identification numbers is periodically updated and transmitted to the second processing unit 314 by the back office 402.

If the hash value does not belong to the list of blacklisted unique-identification number, the first processing unit 308 (at block 414) send a command for the opening of the gate 102. However, if the hash value belongs to the list of blacklisted unique-identification number, the first processing unit 308 (at block 416), denies opening of the gate.

Figure 5:
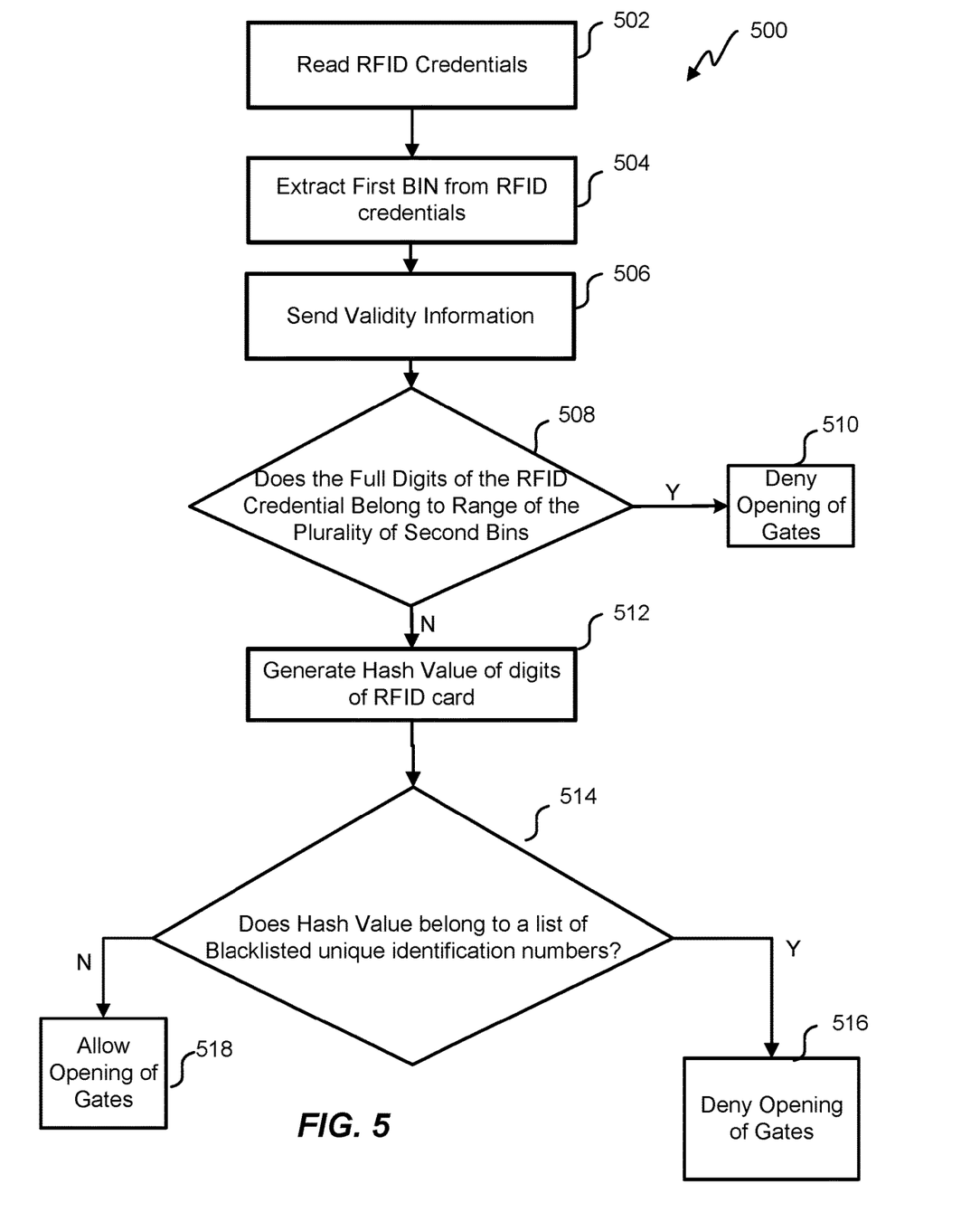
FIG. 5 illustrates a flow diagram of a method for regulating access in a transit system, in accordance with one embodiment of the present disclosure.

Referring to FIG. 5 now, a flowchart of a method 500 for regulating access in the transit system 100 is disclosed, in accordance with some embodiment of the present disclosure. With the increase in the number of digits entailed for verification of the RFID credentials as per the new payment guidelines, the storage entailed to store the digits also increases. Further, in the turnstile gate 102, it is entailed that the processing of the RFID credentials occurs as fast as possible such that the user presenting the RFID credentials at the gate does not have to wait for gate 102 to open. For this, the RFID credentials have to be processed locally with no need to need to send the RFID credentials to the service providers through the internet.

The present disclosure ensures the processing of the RFID credentials occurs at gate 102 locally. The local processing of the RFID card ensures that gate 102 can open for the passenger the moment the passenger presents the RFID card at gate 102, i.e., not create any delay. Further, the present disclosure ensures that the new payment guidelines are compiled with no requirement to modify the existing hardware.

At block 502, RFID credentials are read. The RFID credentials are read when a passenger willing to travel in public transport presents his/her RFID credentials at gate 102. The RFID credentials can be presented in the form of an RFID card or can be stored in a smart device present with the passenger. Gate 102 can be a turnstile gate i.e., instantly opens when the passenger presents the RFID card. The reading of the RFID credentials is performed by an RFID reader present inside gate 102.

Once the RFID credentials are read, at block 504, a first bin is extracted from the RFID credentials by the first processing unit 308. The first bin or the first bank identification number is a number present in the RFID credentials which are used by the service providers (for example, banks) to identify various information associated with the RFID credentials. In one embodiment, the first bin is the 6 digits of the RFID credentials. However, the first bin is not limited to the 6 digits and can include any number of digits except the total number of digits of the RFID credentials. The first bin is transmitted to the second processing unit 314.

At block 506, the method comprises sending the validity information for a plurality of second bins. The validity information is transmitted by the second processing unit 314 to the first processing unit 308. The validity information indicates which of the plurality of second bins are valid. In one embodiment, the plurality of second bins comprises 8 digits, but in other embodiments the bin is any integer between 7-11 digits.

At block 508, method 500 comprises determining if the digits of the RFID is in the range of the plurality of second bins i.e., determining if the 6 digits belong to the range of the 7-11 digits. The 7-11 digits can indicate which of the RFID credentials are considered invalid. The validity can be determined by the service provider issuing the RFID credentials.

If the digits of the RFID belong to the range of the plurality of second bins (i.e., "Y" at block 510), it is determined that the RFID credentials presented at the RFID reader are invalid and the opening of the movable barrier 206 present in the gate 102 is denied.

However, if the full digits of the RFID does not belong to the range of the plurality of second bins the method 500 proceeds to block 512 where a hash value of the full number (i.e., all the digits) of the RFID credentials is generated. Since the full number of the RFID credentials is a secured number, the security of this number has to be maintained. Thus, a hash value is generated using a hashing algorithm. The matching hashing algorithm is used to hash the list of blacklisted unique-identification numbers stored in memory 310. The list of unique-identification numbers indicates the list which is blacklisted by the service providers issuing the RFID credentials. The RFID credentials can be blacklisted by the service providers of the RFID card based on certain factors, such as bills not paid by the cardholder, cards involved in fraudulent transactions, etc.

At block 514, the first processing unit 308 checks if the hash value of the full numbers of the RFID card received by the first processing unit 308 belongs to the list of hash values of the RFID credentials stored in memory 310. This check indicates if the RFID credentials presented by the passenger at gate 102 are considered to be blacklisted credentials by the service provider. If the credentials belong to the blacklisted list (block 516), the opening of the movable barrier 206 is denied or else the opening of the movable barrier 206 is permitted (block 518).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A gate for regulating access in a transit system, the gate comprising:
   a movable barrier;
   a secured storage on a first circuit card;
   a Radio Frequency Identification (RFID) card reader coupled with the secured storage;
   a first processing unit coupled with the secured storage, wherein the first processing unit is configured to:
     read a set of digits from an RFID credential when the RFID credential is presented to the RFID card reader,
     generate a hash value of the set of digits;
     transmit a first bank identification number, wherein the first bin is a subset of the set of digits; and
     transmit the hash value of the set of digits;
   a memory on a second circuit card, wherein the memory has larger capacity than the secured storage;
   a second processing unit coupled with the memory, wherein the second processing unit is configured to:
   receive the first bin from the first circuit card;
   sends validity information for a plurality of second bins to the first circuit card, wherein:
     the validity information indicates which of the plurality of second bins is valid;
     the plurality of second bins each have a greater number of digits than the digits in the first bin;
     check the hash value of the set of digits in a list of a hash values of a plurality of unique-identification numbers associated with a plurality of RFID credentials in the memory, wherein the list of the hash values of the plurality of unique-identification numbers indicate a list of RFID credentials that corresponding to a first list,
   the first processing unit configured to:
     regulate opening of the movable barrier depending on the hash value of the set of digits is on the first list; and
     deny the opening of the movable barrier depending on a second bin from the plurality of second bins corresponding to the RFID credential is invalid.

2. The gate for regulating access in a transit system, as claimed in claim 1, wherein the RFID card reader processes the RFID credentials within a normal pace of a user at 2 meter per second.

3. The gate for regulating access in a transit system, as recited in claim 2, wherein the RFID card reader processes the RFID credentials within an interval of a half-second.

4. The gate for regulating access in a transit system, as recited in claim 1, wherein the RFID credentials are provided through an RFID card or stored on a smart device.

5. The gate for regulating access in a transit system, as recited in claim 1, wherein regulate opening of the movable barrier depending on if the hash value of the set of digits is on a first list comprises:
   opening the movable barrier if the hash value of the set of digits is not on the first list; and
   deny the opening of the movable barrier if the hash value of the set of digits is on the first list.

6. The gate for regulating access in a transit system, as recited in claim 1, wherein first bin comprises of six digits of the RFID credentials.

7. The gate for regulating access in a transit system, as recited in claim 1, wherein the plurality of second bins comprises 7-11 digits of the RFID credentials.

8. The gate for regulating access in a transit system, as recited in claim 1, wherein the first list comprises the list of RFID credentials that are blacklisted by a service provider issuing the RFID credentials.

9. A method for regulating access in a transit system, the method comprising:
   in a secured storage on a first circuit card:
     reading a set of digits from Radio Frequency Identification (RFID) credential when the RFID credential is presented to an RFID card reader;
     generating a hash value of the set of digits;
     transmitting a first bank identification number, wherein the first bin is a subset of the set of digits; and
     transmitting the hash value of the set of digits;
   in a memory on a second circuit card:
     receiving the first bin from the first circuit card;
     sending validity information for a plurality of second bins to the first circuit card, wherein:
     the memory has larger capacity than the secured storage;
     the validity information indicates which of the plurality of second bins is valid; and
     the plurality of second bins each have a greater number of digits than the digits in the first bin;
     checking if the hash value of the set of digits is a member of a list of a hash values of a plurality of unique-identification numbers associated with a plurality of RFID credentials present in the memory, wherein the list of the hash values of the plurality of unique-identification numbers indicate a list of RFID credentials that belong to a first list;

in the first circuit card:
regulating opening of a movable barrier depending on if the hash value of the set of digits is on the first list; and denying the opening of the movable barrier if a second bin from the plurality of second bins corresponding to the RFID credential is invalid.

10. The method for regulating access in a transit system, as claimed in claim 9, wherein the RFID card reader processes the RFID credentials during a stride of a passenger.

11. The method for regulating access in a transit system, as recited in claim 10, wherein the RFID card reader processes the RFID credentials within an interval of half-second.

12. The method for regulating access in a transit system, as recited in claim 9, wherein the RFID credentials are provided through a RFID card or stored on a smart device.

13. The method for regulating access in a transit system, as recited in claim 9, wherein regulate opening of the movable barrier depending on if the hash value of the set of digits is on the first list comprises:

opening the movable barrier if the hash value of the set of digits is not on the first list; and denying the opening of the movable barrier if the hash value of the set of digits is on the first list.

14. The method for regulating access in a transit system, as recited in claim 9, wherein first bin comprises of six digits of the RFID credentials.

15. The method for regulating access in a transit system, as recited in claim 9, wherein the plurality of second bins comprises 7-11 digits of the RFID credentials.

16. The method for regulating access in a transit system, as recited in claim 9, wherein the first list comprises a list of RFID credentials which are blacklisted by a service provider issuing the RFID credentials.

17. A non-transitory computer-readable medium having instructions embedded thereon for regulating access in a transit system, wherein the instructions, when executed by a plurality of processors, cause the plurality of processors to:

in a secured storage on a first circuit card:
reading a set of digits from Radio Frequency Identification (RFID) credential when the RFID credential is presented to a RFID card reader;

generating a hash value of the set of digits;

transmitting a first bank identification number, wherein the first bin is a subset of the set of digits; and transmitting the hash value of the set of digits;

in a memory on a second circuit card:
receiving the first bin from the first circuit card;

sending validity information for a plurality of second bins to the first card, wherein:

the memory has larger capacity than the secured storage;

the validity information indicates which of the plurality of second bins is valid; and the plurality of second bins each have a greater number of digits than the digits in the first bin;

checking if the hash value of the set of digits is a member of a list of a hash values of a plurality of unique-identification numbers associated with a plurality of RFID credentials present in the memory, wherein the list of the hash values of the plurality of unique-identification numbers indicate a list of RFID credentials that belong to a first list, in the first circuit card:
regulating opening of a movable barrier depending on if the hash value of the set of digits is on the first list; and denying the opening of the movable barrier if a second bin from the plurality of second bins corresponding to the RFID credential is invalid.

18. The non-transitory computer-readable medium, as claimed in claim 17, wherein the RFID card reader processes the RFID credentials during a stride of a passenger.

19. The non-transitory computer-readable medium, as recited in claim 17, wherein the RFID card reader processes the RFID credentials within an interval of half-second.

20. The non-transitory computer-readable medium, as recited in claim 17, wherein the RFID credentials are provided through an RFID card or stored on a smart device.

* * * * *